May 28, 1957 — F. NATHAN — 2,794,104
PHOTOENGRAVING BURNING-IN APPARATUS
Filed July 29, 1955

INVENTOR.
FREDERICK NATHAN
BY
ATTORNEYS

United States Patent Office 2,794,104
Patented May 28, 1957

2,794,104

PHOTOENGRAVING BURNING-IN APPARATUS

Frederick Nathan, Bronx, N. Y.

Application July 29, 1955, Serial No. 525,229

7 Claims. (Cl. 219—19)

The present invention relates generally to the art of photoengraving and more particularly to a novel technique for burning in a photographic plate and apparatus adapted to carry out this technique.

Photoengraving entails the production of metallic printing surfaces in relief with the ultimate object of multiplying copies thereof by the printing press. In the standard photoengraving process, an image is first obtained by means of a camera as a negative or positive, which image is then transferred by photographic exposure directly onto a metal plate prepared with a light-sensitive coating. Thereafter the exposed plate is developed, dried and placed in a heating chamber where the image is "burnt in." The burning in process functions to allow the unprotected parts of the plate to be etched by chemical or electrolytic action below the printing surface.

Conventionally, the burning-in process is accomplished by the use of a gas stove with open burners, an electric or an infra-red stove. This procedure is normally carried out manually and has several serious drawbacks. In the first place it is difficult to heat the plate uniformly since the temperature to which the plate is raised depends on the experience and skill of the operator, and is not automatically controlled. Moreover the ordinary heat source does not furnish evenly distributed heat radiation, with the results that hot points are developed which tend to buckle and warp the plate. This effect materially impairs the printing quality of the plate and renders it unsuitable for multi-color printing inasmuch as the printing portions cannot be brought into proper registration with one another.

A further limitation of conventional burning-in techniques is that a heavy gauge engraving plate must ordinarily be used, and the burning-in process is of relatively long duration, in the order of 6 to 10 minutes.

In view of the foregoing, it is the principal object of the invention to provide an improved burning-in technique for photoengraving plates and an apparatus therefor, which overcomes the disadvantages characterizing the prior art.

More specifically it is an object of the invention to provide a conduction burning-in process wherein the photoengraving work plate is physically pressed against a heating panel whose radiation is uniformly distributed; the work plate being maintained in a flat state whereby buckling or distortion of the plate is obviated.

Also an object of the invention is to provide a conduction burning-in machine wherein the engraving plate is flattened by vacuum means against a heating panel, and where despite the differences in the co-efficient of expansion of the panel and the plate, the plate is not scratched and the image thereof is in no way marred in the course of heating.

A further object of the invention is to provide a conduction burning-in technique permitting the use of relatively light gauge engraving plates.

A further object of the invention is to provide a burning-in technique which is relatively rapid, the plate being burnt-in in a matter of seconds.

Also an object of the invention is to provide a burning-in technique which is reliable and efficient and which may be carried out inexpensively.

For a better understanding of the invention as well as other objects and further features thereof, reference is had to the following description to be read in connection with the accompanying drawing, wherein like elements in the different views are identified by like reference numerals.

Before considering the conduction burning-in technique in accordance with the invention, the usual steps preceding burning-in of the engraving plate will first be briefly described.

The metal plate to be engraved is thoroughly scrubbed and then coated with a light sensitive solution. The plate may be fabricated of copper, magnesium, zinc, thin steel, or any other metal suitable for photoengraving or etching purposes. The solution is constituted by a photosensitive resist, usually bichromated mixture of gelatin, shellac and glue, etc. The coated plate is now placed in a whirler, which may be heated, and the solution dried.

The dried plate is inserted in a vacuum frame and the photographic negative of the subject to be engraved is placed in contact with the coated plate by vacuumizing the space between the negative and the plate. At this point, the coated plate is illuminated through the negative and after the proper exposure interval, the plate is washed or developed in water. The wet plate is again placed in the whirler and dried. The dried plate is now ready to be burnt-in.

Figure 1:
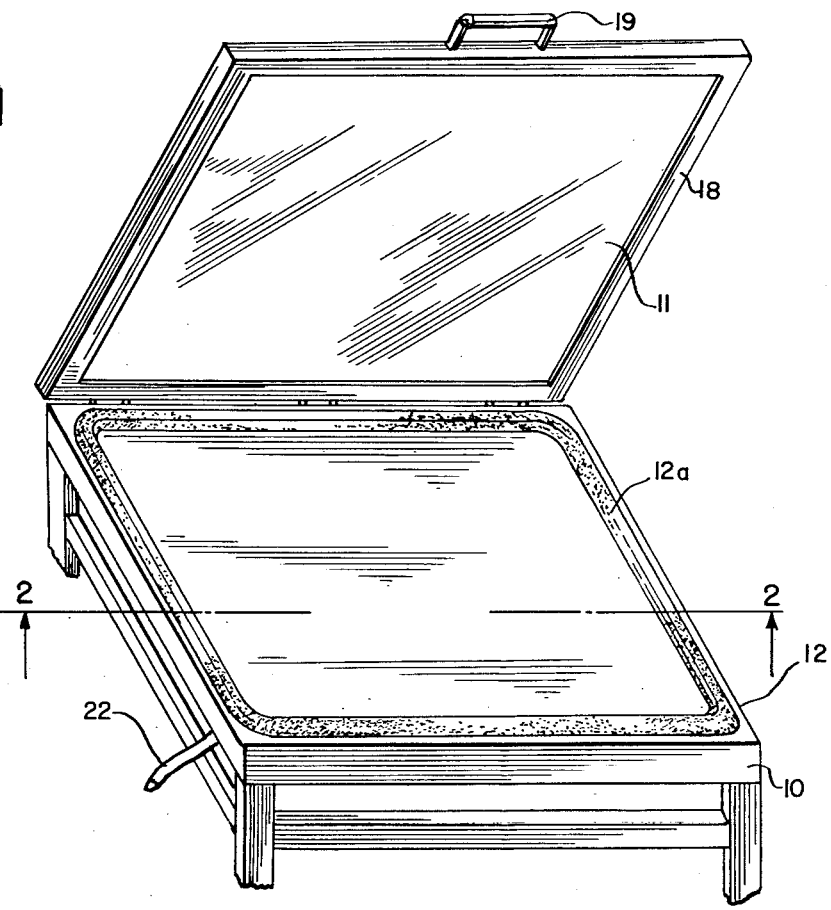
Fig. 1 is a perspective view of a preferred embodiment of conduction burning-in machine in accordance with the invention.
Figure 4:
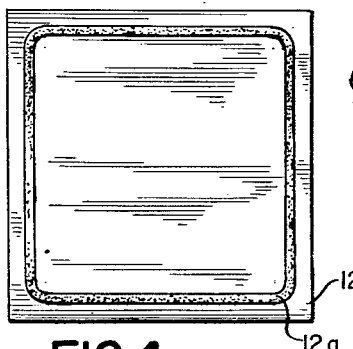
Fig. 4 is a separate plan view of the flexible blanket included in the machine.

As best seen in Fig. 1, the burning-in machine is mounted on a supporting structure or table 10. The machine comprises a rectangular heating element, generally designated by numeral 11, hingedly secured to the table, and a flexible blanket 12 which rests on the surface of the table. While hinging has been disclosed herein, it is to be understood that alternatively the heating elements may be brought down on the blanket by vertical elevation control means. As shown separately in Fig. 4, the blanket 12 is rectangular in form and is provided with a rectangular ridge or raised bead 12a which is inset from the periphery of the blanket and serves to provide a vacuum enclosure for the engraving plate. The blanket is preferably fabricated of silicone rubber or any other material adapted to withstand the burning-in temperatures, which may go as high as 750° F.

The metal work plate 13 to be engraved is sandwiched between upper and lower expansion plates 14 and 15, the sandwich being placed on the blanket 12 within the vacuum enclosure surrounded by bead 12a. The lower expansion plate is of relatively heavy gauge steel, brass or any other suitably rigid metal. The upper expansion plate 15 may be constituted by a metal plate formed of the same material as the work plate and having the same gauge. The upper expansion plate preferably should be of a metal which is softer than the work plate. The upper expansion plate 15 is in contact with the upper or image surface of the work plate, whereas the lower expansion plate is in contact with the uncoated surface of the work plate.

A film of oil is provided between the upper and lower work plate surfaces and the upper and lower expansion plates respectively. The oil is of the high temperature type, such as cylinder oil, as is designed to withstand the temperatures encountered in the burning-in process.

Figure 3:
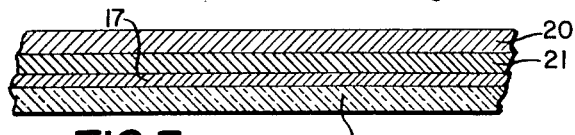
Fig. 3 is a separate sectional view showing the details of the heating panel included in the machine.

As shown separately in Fig. 3, the heating element or panel is constituted by a sheet of heat resistant glass 16, such as Pyrex brand, having an electrically conductive transparent film 17 on the upper surface thereof. The sheet is supported at the corners by suitable insulation within a rectangular frame 18 formed for example of aluminum and provided with a handle 19, whereby the panel may be brought down on the blanket. On opposing edges of the panel a thin silver strip (not shown) is bonded to distribute the electric current evenly along the length of the panel.

Electrical connection is made to the silver contact strip by suitable contact means, whereby the conductive film is heated uniformly by the passage of current therethrough. Placed over the conductive film 17 is a reflecting plate 20 preferably formed of steel, the plate being insulated from the film by an insulating layer of mica 21. Because the heating panel radiates heat from a planar area, it offers uniformity of heat distribution in a direction perpendicular to the surface thereof.

Figure 2:
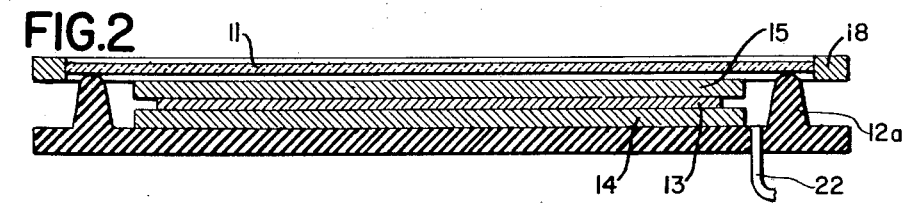
Fig. 2 is a sectional view taken along the plane of lines 2—2 in Fig. 1.

As shown in Fig. 2, when the heating panel is brought down upon blanket 12, the bead 12a engages the undersurface of the glass sheet to provide a hermetic seal therewith. The vacuum enclosure is evacuated by means of a conduit or hose 22 which is coupled to the blanket and communicates with the enclosure. The hose 22 is connected to a suitable vacuum pump, whereby when the enclosure is evacuated the sandwich formed by the work plate and the upper and lower expansion plates is pressed firmly against and in intimate contact with the glass panel 16.

Thus the sandwiched plates and the conductive film 17 on the glass panel lie in parallel relation, and infra-red radiation from the film is projected perpendicularly therefrom through the upper expansion plate to heat the work plate uniformly. Heating can be closely controlled by varying the applied voltages, using thermostats or by applying percentage timers. The infra-red radiation from the heating panel is aimed directly into the work plate by the reflector and little heat is dissipated to the atmosphere. There is no oppressive heat in the area of the machine which would give rise to uncomfortable working conditions.

The oiling of the top of the lower expansion plate and the bottom of the upper expansion plate is to allow the heated work plate 17 to expand without abrasion, thereby protecting the coated surface of the work plate and eliminating scratches, etc.

It is to be noted, that with conventional burning-in techniques relatively heavy gauge work plates must be used, in the order of 65 thousandths of an inch. With the present invention one may successfully employ work plates of light gauge, in the order of 10 to 30 thousandths of an inch, the thin plate being free from mechanical distortion after the burning-in is effected. The burning-in temperatures may be in the range of 500 to 750° F. and the heating period may be from 30 seconds to 2 minutes, as desired. In any event a much briefer heating period is possible with the present invention.

While a vacuum system has been disclosed as the means for effecting intimate contact between the work plate sandwich and the heating panel, it is to be understood that this same effect may be carried out by pressure means adapted to apply a uniform downward pressure on the sandwich. heating panel or an upward pressure on the sandwich.

While there has been shown what is considered to be a preferred embodiment of the invention, it is to be understood that many changes and modifications may be made therein without departing from the essential spirit of the invention. It is intended therefore in the appended claims to cover all such changes and modifications as fall within the true scope of the invention.

What is claimed is:

1. Burning-in apparatus for photoengraving work plates having a light-sensitive coating on one surface thereof, said apparatus comprising a flexible blanket having a bead formed thereon to define a vacuum enclosure, upper and lower expansion plates receivable within said enclosure to form a sandwich therein with said work plate, said upper plate being engageable with the coated surface of said work plate, a planar heating panel providing uniformly distributed heat radiation, means removably to position said panel on said blanket to form a hermetic seal with said bead, and conduit means communicating with said enclosure to evacuate said enclosure to cause said sandwich to press against said panel whereby said upper plate is in intimate contact therewith and said work plate is heated by conduction.

2. Apparatus as set forth in claim 1 further including a first film of oil between said upper plate and said work plate and a second film of oil between said lower plate and said work plate.

3. Burning-in apparatus for a photoengraving work plate having a light-sensitive coating on one surface thereof, said apparatus comprising a flexible blanket made of silicone rubber and having a rectangular bead formed thereon to define a vacuum enclosure, upper and lower expansion plates receivable within said enclosure to form a sandwich with said plate, said upper plate being of soft metal relative to said work plate and being engageable with the coated surface thereof, said lower plate being relatively rigid, a planar heating panel providing uniformly distributed heat radiation, means removably to position said panel on said blanket to form a hermetic seal with said bead, and conduit means communicating with said enclosure to evacuate said enclosure.

4. Burning-in apparatus, as set forth in claim 3, further including a supporting structure for said blanket, and wherein said panel is hingedly secured to said structure.

5. Burning-in apparatus for a photoengraving work plate having a light-sensitive coating on one surface thereof, said apparatus comprising a flexible blanket having a rectangular bead defining a vacuum enclosure, upper and lower expansion plates receivable within said enclosure to form an oiled sandwich with said work plate, a planar heating panel providing uniformly distributed radiation, said panel including a glass sheet having a conductive film thereon, contact means to conduct current through said film and a reflecting plate insulated from said film to direct said radiation downwardly, and means removably to position said panel on said blanket to form a hermetic seal with said bead.

6. Burning-in apparatus for photoengraving work plates of relatively light gauge having a light-sensitive coating on one surface thereof, said apparatus comprising upper and lower expansion plates adapted to form a sandwich with said work plate, said upper plate being engageable with the coated surface of said work plate and being of a relatively soft metal, a planar heating panel providing uniformly distributed heat radiation, and means to press said sandwich against said panel whereby said upper plate is in intimate contact therewith and said work plate is heated by conduction, said heating panel including a glass sheet having a conductive film on the upper surface thereof and means to conduct current through said film to produce infra-red radiation uniformly in a direction perpendicular to said film.

7. Burning-in apparatus for photoengraving work plates of relatively light gauge having a light-sensitive coating on one surface thereof, said apparatus comprising upper and lower plates adapted to form a sandwich with said work plate, said upper plate being engageable with the coated surface of said work plate, a planar heating panel providing uniformly distributed heat radiation, and means to press said sandwich against said panel whereby said upper plate is in intimate contact therewith and said work plate is heated by conduction, said heating panel including a glass sheet having a transparent conductive film on the upper surface thereof, a mica layer disposed on said film, a reflecting plate disposed on said mica layer, and means to conduct current through said film to produce infra-red radiation uniformly in a direction perpendicular to said film.

References Cited in the file of this patent

UNITED STATES PATENTS

| | | |
|---|---|---|
| 1,960,697 | Cochran et al. | May 29, 1934 |
| 2,247,623 | Van Hofe | July 1, 1941 |
| 2,513,993 | Burton | July 4, 1950 |
| 2,624,389 | Bungay | Jan. 6, 1953 |
| 2,651,702 | Burke et al. | Sept. 8, 1953 |
| 2,653,394 | Nelson et al. | Sept. 29, 1953 |